Oct. 14, 1941.  M. S. YOUNG ET AL  2,258,636
LUBRICANT DISPENSING
Filed June 18, 1938   2 Sheets-Sheet 1
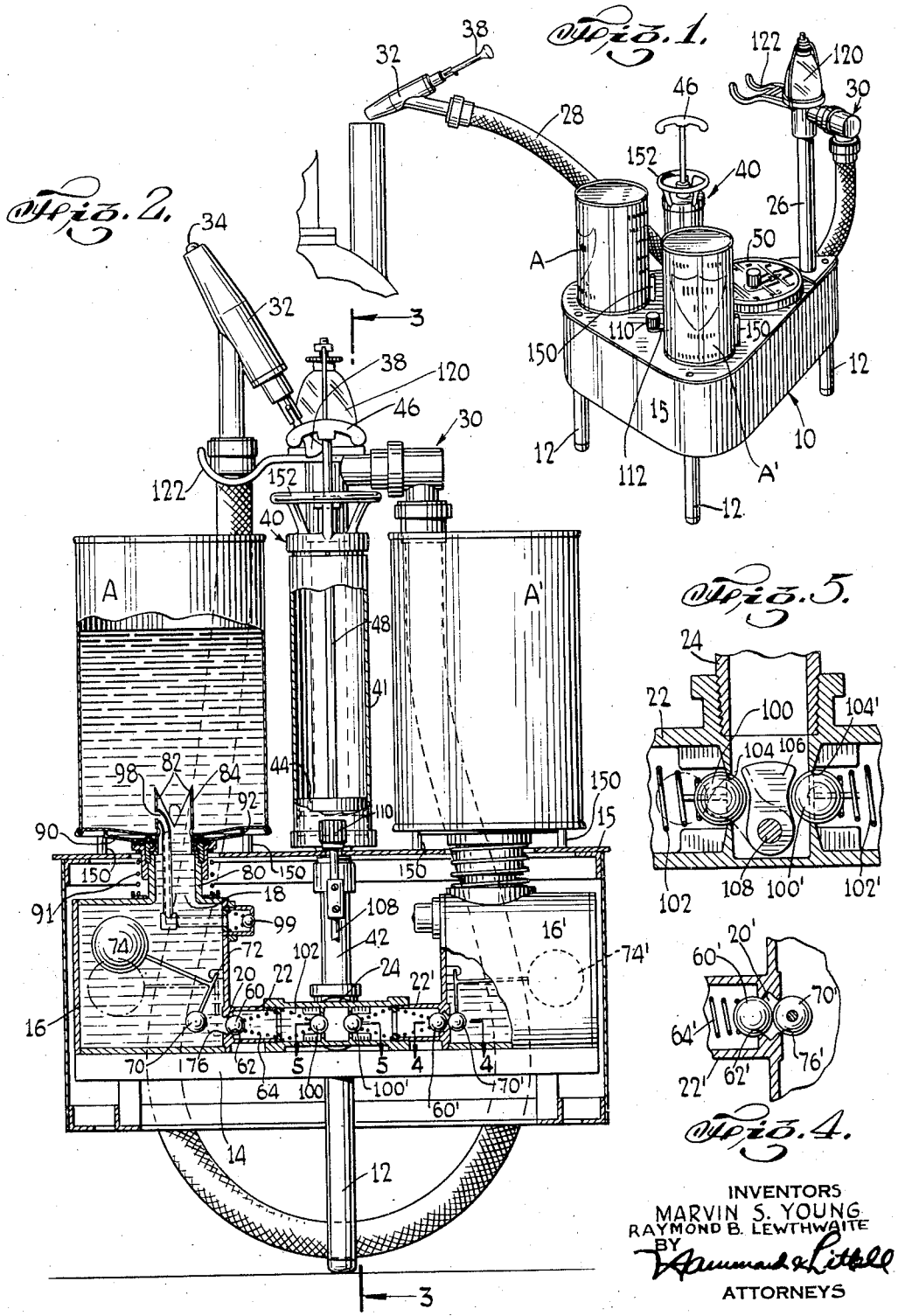
INVENTORS
MARVIN S. YOUNG
RAYMOND B. LEWTHWAITE
BY
*Hammond & Littell*
ATTORNEYS Oct. 14, 1941.  M. S. YOUNG ET AL  2,258,636
LUBRICANT DISPENSING
Filed June 18, 1938  2 Sheets-Sheet 2
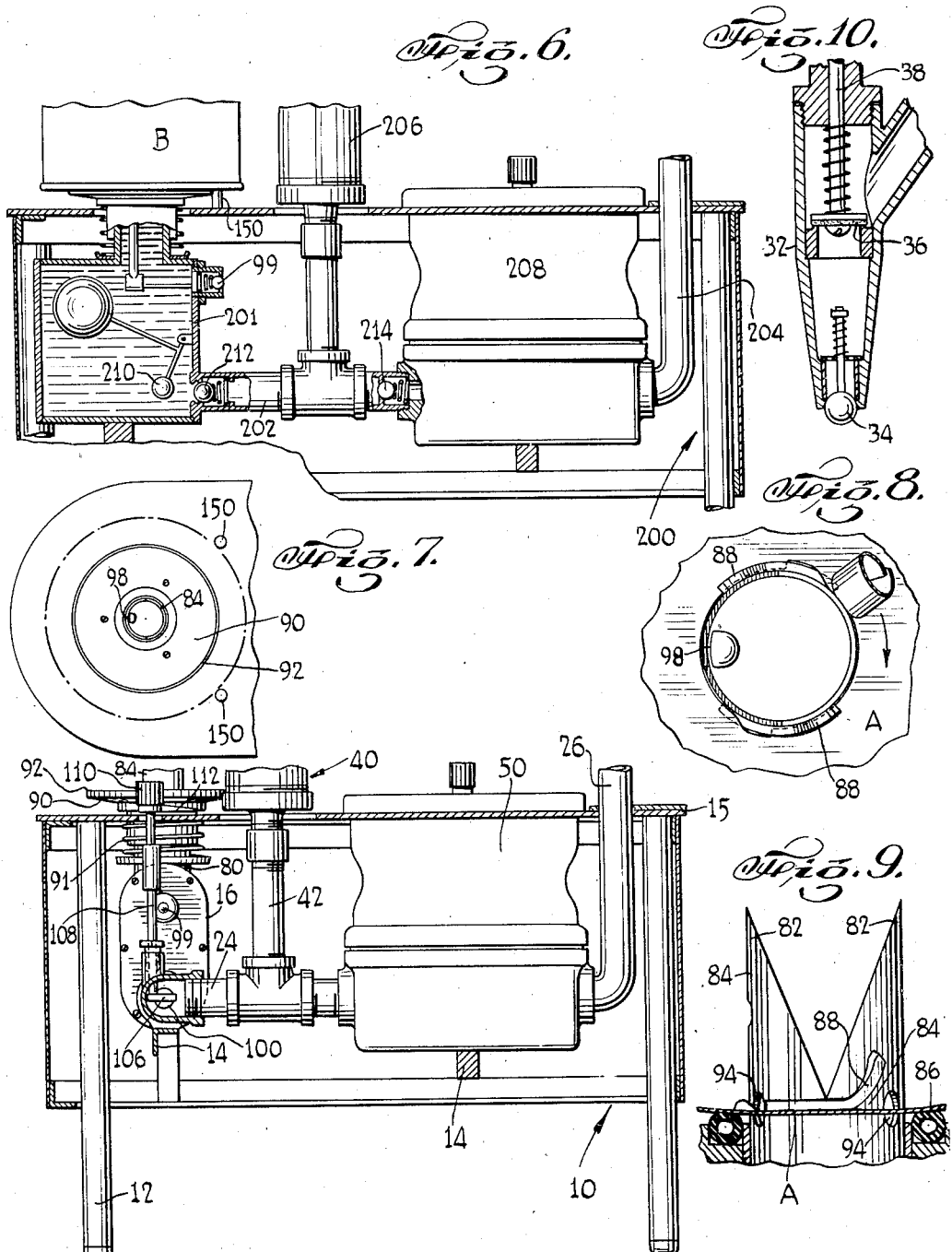
INVENTORS
MARVIN S. YOUNG
RAYMOND B. LEWTHWAITE
BY
ATTORNEYS Patented Oct. 14, 1941

2,258,636

UNITED STATES PATENT OFFICE 2,258,636

LUBRICANT DISPENSING

Marvin S. Young, Scarsdale, N. Y., and Raymond B. Lewthwaite, Hasbrouck Heights, N. J., assignors, by mesne assignments, to The Merlin Corporation, New York, N. Y., a corporation of Delaware Application June 18, 1938, Serial No. 214,448

24 Claims. (Cl. 221—95)

This invention relates to new and improved apparatus and practices for dispensing liquid and, particularly, for dispensing liquid lubricant in the operation of service stations for motor vehicles.

A common practice in dispensing lubricating oil and the like has been to store large quantities of oil in stationary drums or tanks and to pump the oil as required from such tanks into measuring cans or bottles by which it is carried and poured into a waiting vehicle. This practice is subject to numerous practical objections, not the least of which are the opportunities it affords for inaccurate measuring and for fraudulent substitution of brands and grades of oil other than order by the purchaser. In recent years the practice has grown of using an individual sealed container for each dispensation, or of using measuring containers having keyed nozzles which cooperate with keyed storage tanks, to prevent substitution of brands or grades. The use of individual sealed containers, such as sealed metal cans of one quart capacity, for every sale of oil, however, has involved considerable inconvenience and expense; also, it is impossible to deliver an accurately determined amount of oil when using this practice. The very fact of packing the oil in sealed cans makes it impractical, with any known can dispensing system, to supply to a customer only a part of the contents of a can because a customer desiring protection against substitution would not be satisfied to accept oil from a can which had been opened previously with any present type of can dispenser; hence the oil must be packed at the refinery in a multiplicity of small containers, and in containers of different sizes for maximum efficiency of dispensation, and costs are increased by the cost of the many containers and the costs of filling, packing, shipping and handling the same. On the other hand, when keyed measuring containers are used in dispensing the oil, according to past practice, each container is filled and emptied to supply a unit quantity of oil, so that inaccurate deliveries result due to the clinging of oil on the inside of the containers, and in the practical use of keyed containers sediment accumulates in them and difficulty is encountered in opening and cleaning them. Moreover, the use of keyed containers requires storage tanks for holding the supply of oil, which, for effective protection against substitution, must be provided with means preventing access to their contents by everyone except an authorized employee.

None of the equipment and practices that have been used prior to the present invention has provided a practical solution of the problem of dispensing accurate amounts of lubricant in the operation of filling stations and the like. The practice of dispensing unit quantities of oil directly from individual sealed cans or individual keyed or open measuring containers results in the delivery of less amounts than have been ordered because lubricating oil is a viscous liquid and a substantial amount of the oil in each container clings to walls and crevices of the container within the time allowed for pouring.

While there have been many proposals having in view the dispensation of lubricating oil from portable dispensers, these have been impractical for service station operations, and they also have usually been objectionable because of lack of assurance of accurate deliveries or lack of protection against substitution. Typical prior proposals involve the use of bulky units, possibly on wheels, each consisting of one or more storage tanks for the lubricant and means for delivering the lubricant from the storage tank directly into an automobile. Such a device, however, is impractical for service station operations because it cannot be moved readily to serve cars wherever they may happen to stop. The oil intake side of the car is often close to the "islands" where gasoline dispensing equipment is located and another car may be parked on the opposite side of the island thus rendering the oil intake inaccessible to these bulky devices.

An object of our invention is to provide a convenient, economical and practical means of dispensing accurately measured amounts of lubricating oil or the like under all conditions encountered in the operation of automobile service stations, and to provide a dispensing device which will coact with any one of the several methods that are now used for packaging and storing lubricating oil.

Another object of our invention is to provide new and improved liquid dispensers, and new dispensing practices for use in dispensing lubricating oil and the like, which eliminate the expense, inaccuracies and inconvenience of using an individual sealed container, and the difficulties encountered in using a keyed measuring container, for each dispensation in the operation of service stations.

Another object is to provide a portable liquid dispenser, that is light in weight, easy to handle and convenient to use, of particular value for service stations and like uses, by which exact metered amounts of lubricant may be dispensed from portable supply containers directly into the vehicles to be serviced, in full view of the purchasers and under conditions preventing contamination of the lubricant by dirt or other foreign substances.

Another object of the invention is to provide such a dispensing system in which the lubricant may be dispensed directly from sealed and branded portable supply containers holding enough lubricant for several dispensations while giving protection to the purchaser against fraudulent substitution of brands or grades, thus eliminating the need for a multiplicity of individual sealed containers and for containers of different sizes and permitting the lubricant to be packed, shipped and handled economically in relatively large frangible containers of standard size.

A further object of the invention is to provide a portable dispenser for lubricant and the like including a portable carriage having feed lines and a communicating delivery hose mounted thereon for feeding and delivering lubricant directly from a portable supply container carried on and attached to the dispenser to a point of dispensation, such as the crank case of an automobile, together with means ensuring accurate metering of the lubricant so delivered, means continuously maintaining the hose full of lubricant, and means permitting easy replacement of an empty by a full supply container without affecting the metering of lubricant delivered therefrom.

Another object is to provide for the dispensing of liquid, such as lubricating oil, directly from replaceable portable supply containers by means of a portable dispenser that is readily liftable and movable to and from different locations for operation in full view of the purchaser of the oil and which includes means for pumping, metering and delivering the lubricant from such a supply container carried thereon directly to the place of use; and in such a dispenser, including a valve compartment for receiving lubricant from the supply container, to provide means adjacent the valve compartment for attaching portable supply containers thereto and for quickly establishing communication and flow of liquid thereinto from a cooperating supply container placed thereon. A further object is to provide special means of this type for cooperation with sealed frangible containers.

Still another object of the invention is to provide portable dispensers for lubricant and the like comprising the combination of a portable carriage upon which are mounted feed lines for receiving and delivering lubricant to a point of dispensation, a pump for feeding the lubricant through the feed lines, a meter for accurately gauging the lubricant fed by the pump and means operative automatically to indicate when a supply container communicating with the feed lines is empty and requires replacement and to prevent access of air into the feed lines after such a container is empty.

A further object of the invention is to provide a portable dispensing device of the type mentioned hereinabove by which lubricant may be dispensed from one supply container until it is emptied and then dispensed directly from another supply container without substantial interruption of operations; and in such a device to provide means continuously maintaining the feed lines and delivery hose of the dispenser full of oil and preventing access of air or other foreign matter thereto.

Other special features of the invention include novel arrangements of parts of the device to form therewith a unitary portable carriage, novel combinations of valves and valve control means assuring satisfactory operation of the device, the provision of novel means for facilitating the complete drainage of liquid from a supply container when sealed metal cans are used as the supply containers, and the provision of special means for venting such sealed containers when in dispensing position.

These and other objects and features of the invention will be made apparent by the ensuing detailed description of illustrative embodiments thereof, when considered in conjunction with the accompanying drawings.

In the drawings, Figure 1 is a perspective view of a portable dispenser provided by the present invention, in condition for delivery of oil into the crank case of an automobile.

Figure 2 is an end view of the dispenser, partly in section.

Figure 3 is a longitudinal view of the same dispenser, partly in section, further revealing the arrangement of parts inside the portable carriage.

Figure 4 shows a detail of construction in horizontal section, taken along the line 4—4 of Figure 2.

Figure 5 shows other details of construction, as viewed in section along the line 5—5 of Figure 2.

Figure 6 is a fragmentary view, in longitudinal section, of another illustrative embodiment of the invention.

Figure 7 is a plan view of an end portion of the dispenser shown in Figure 6, with the liquid supply container removed from the dispenser.

Figure 8 is a fragmentary plan view, showing part of the bottom wall of a sealed metal container after placing the same in dispensing position on the dispenser illustrated in Figures 1 to 3, inclusive.

Figure 9 is a vertical section through part of the bottom wall of such a container when in dispensing position, and Figure 10 is a longitudinal cross section showing details of the nozzle construction used in the illustrated embodiments.

In accordance with the present invention, instead of dispensing lubricating oil into open or keyed measuring containers for delivery therefrom into waiting vehicles, or of packing lubricant in individual sealed containers, one for each dispensing operation, the lubricant is carried to locations close to the vehicles in portable supply containers that hold enough oil for several unit dispensations. These containers may be standard sealed cans, for example, of five quart capacity, that have been packed, sealed and branded before delivery for retail sale, or they may be keyed refillable supply containers or ordinary open containers. The containers are attached to a novel portable dispenser and at the same time are opened to permit the flow of oil therefrom, and the oil so liberated is fed directly from the supply containers into the vehicles through the dispenser and is metered accurately during its travel to the points of use.

Since the dispensing device accurately measures the oil that is fed through it, the capacity of the attached supply container becomes unimportant as the supply container no longer acts as a measure. Thus any quantity a particular customer may desire can be dispensed from a container, say of five quart capacity, attached to the dispenser.

This new dispensing practice is carried out by the use of novel portable dispensers of which the constructions illustrated in the drawings are illustrative examples. The several parts of the dispensing means may be mounted on or together so as to form a small portable carriage which, with one or more removable supply containers attached thereto, may easily be lifted and moved to and from different locations for the delivery of accurately metered quantities of oil from the supply containers directly to the points of use. Thus the source of the oil, the manner of dispensing it and the amount dispensed in each operation may be visible to the purchaser, and when sealed and branded supply containers are used and purchaser is protected against substitution of brands or grades of oil other than ordered because it is ensured that, once the container is attached to the dispenser, the container cannot be removed and replaced on the dispenser without spilling the oil. At the same time the costs and difficulties heretofore encountered in providing such protection are reduced to a minimum.

The carriage of the portable dispensers herein disclosed serves as a support for a separate portable supply container from which the oil is to be dispensed and as a mounting for the several parts of the dispensing means. Means are provided for releasably attaching these supply containers, which are normally separate and independent from the dispenser, to the dispenser. Appropriate feed lines are mounted on the carriage to receive the oil liberated from a supply container, and these terminate in a delivery hose by which metered amounts of the lubricant are delivered directly to the points of use. A pump and a meter are connected with the feed lines and mounted on the carriage so as to feed the lubricant through the dispenser and meter it during its travel to the hose. The entry end of the feed lines comprises a feed or control compartment adapted to receive and pass the oil from an attached supply container through the dispenser and having means adjacent thereto for establishing communication and flow of liquid between such container and the control compartment. The feed compartment, in practice, renders the dispenser operative when a supply container holding a quantity of lubricant is attached thereto and renders the dispenser inoperative when an attached supply container has been emptied. To these and other ends, the control compartment includes means for blocking the flow of liquid through the dispenser and rendering the device inoperative after a communicating supply container is empty and for preventing access of air into other portions of the feed lines. This means is arranged so that it again renders the dispenser operative, in response to gravity flow of oil thereto, when a supply container containing a renewed supply of oil is attached to the dispenser. Means also are provided for continuously keeping the conduits between the feed compartment and the delivery end of the hose full of oil so that the metering of liquid passing through the dispenser will be accurate and the delivery of exact amounts of oil assured.

As illustrated in Figures 1 to 3, inclusive, a portable carriage 10 is provided having means such as legs 12 for supporting the same in upright position, structural members 14 upon which are mounted parts of the dispensing means, and an enclosing casing 15 having top and side walls. A feed or control compartment 16 is located adjacent one end of the carriage, this compartment having an opening 18 in its upper portion, through which liquid flows from an attached overhead portable supply container A, and an opening 20 in its lower portion communicating with a connected branch conduit 22. As shown in Figures 2, 3 and 5, branch conduit 22 is connected with a main conduit 24 which is fixed on the carriage and includes a horizontal portion extending toward the front end of the carriage and a vertical portion 26 extending upwardly adjacent said front end. A flexible hose 28 is fastened at one end, as at 30, to portion 26 of the fixed delivery conduit, and on its free end the hose carries a delivery nozzle 32 having a spring-actuated valve 34 at its end for constantly excluding air from the hose and automatically terminating flow of liquid through the nozzle when pressure on the liquid is relieved. The nozzle also as a spring-actuated valve 36 that is controlled by a valve handle 38 which may be operated to open valve 36 and permit liquid to flow from the nozzle under pressure (see Figure 10).

A pump of any suitable construction is mounted on the carriage and connected with the fixed conduit 24 for feeding liquid from the supply container through the feed compartment, conduits and hose, thus delivering the liquid to a point of dispensation. As illustrated, the pump 40 is an upright reciprocating pump including a barrel 41, a pipe 42 connecting the same with conduit 24 and a plunger 44 in the barrel adapted to be actuated by a handle 46 on a rod 48.

A meter 50 also is connected with the main conduit 24, preferably with its dial fully exposed above the top wall of the carriage casing. The meter may be of any known construction which will accurately gauge the flow of fluid through the feed lines of the dispenser, and since such meters are well known in the art its construction is not illustrated or described in detail.

In the embodiment of Figures 1 to 3, inclusive, a second feed compartment 16' is provided adjacent an end of the carriage for receiving liquid from an overhead portable supply container A', and this second feed compartment communicates with the main conduit 24 through a branch conduit 22' that is connected with the lower portion of the feed compartment. The construction of compartment 16' and of the means associated therewith may be the same as in the case of compartment 16, and further description in detail will be restricted to the latter.

As mentioned above, the dispenser is provided with means for constantly keeping the hose 28 full of liquid and with means for rendering the dispenser inoperative when a supply container communicating with a feed compartment is empty and for preventing access of air into the conduits between a feed compartment and the delivery end of the hose. Valve means are provided for preventing the flow of liquid from the pump toward a feed compartment, a ball valve 60 held against a valve seat 62 by a compression spring 64 serving this purpose (see Figure 4). Such valve means are provided in each branch conduit between the main conduit 24 and the respective feed compartments 16 and 16', so that compression of the pump will result in no substantial flow of liquid toward the feed compartments but will cause flow of liquid out of the feed lines only by way of the meter, hose and nozzle. In each feed compartment, float-controlled valve means are provided for blocking the flow of liquid into the conduits in response to the level of the liquid in the compartment. Thus a ball valve 70 is connected, by links fulcrumed as at 72, to a float 74 that is free to move up and down within the feed compartment in response to the level of liquid therein. The ball valve 70 is arranged to register with a valve seat 76 adjacent opening 20 whenever the float 74 is low enough to permit such registration, before the level of liquid in the feed compartment recedes to opening 20. It will be apparent that when the feed compartment 16 contains sufficient liquid to keep valve 70 away from its seat 76, and when the valve in nozzle 32 is open, liquid may be fed freely from the feed compartment through the fixed conduits, meter and hose and delivered directly to the point of use by operation of the pump. Whenever the level of liquid in the feed compartment is lowered to a point allowing valve 70 to register with seat 76, the flow of liquid from the feed compartment into the feed lines upon operation of the pump is blocked, yet the feed lines are kept full of liquid and entry of air thereinto is precluded.

The capacity of the feed, or control, compartment 16 is so small, and the float control 74 is so arranged therein, that no substantial amount of lubricant can be dispensed after forced flow from the attached supply container has ceased. Although the dispenser may operate momentarily after that instant, this momentary after-operation serves only to promote optimum emptying of the container, through gravity drainage into the small space thus provided in the upper portion of the control compartment, and to avoid spilling of oil upon removal of the emptied container or attachment of another full container to the dispenser.

A special feature consists in the arrangement of valves 60 and 70 so as to prevent the locking of either valve when the pump is operated after valve 70 is closed to block further delivery of liquid. Without such means, should the pump be operated to draw liquid from the feed compartment, valve 70 might be locked against its seat by vacuum with sufficient force to prevent removal from its seat by float 74 when the feed compartment is again filled. To avoid this difficulty, valves 60 and 70 are arranged in closely spaced relation so that neither can rest against its seat and completely block the flow of liquid when the other is seated. Thus when float 74 is lowered and the pump is operated to draw liquid from the feed compartment, valve 70 will be forced against its seat and valve 60 slightly removed from its seat, and when the pump is compressed valve 60 will unseat valve 70 and provide clearance sufficient to prevent vacuum locking of the float.

It will be observed that each feed compartment is relatively small in volume and that it essentially provides space for accommodating the above mentioned float-controlled valve means and for receiving sufficient liquid from an attached supply container to actuate the valve means. The dispenser, adjacent the upper opening of each feed compartment, comprises means for attaching a portable supply container thereto and means for establishing communication and flow of liquid into the compartment from such a cooperating supply container. In the form illustrated in Figures 1 to 3, inclusive, the dispenser is adapted for cooperation with sealed frangible containers, such as sheet metal cans, and such means includes a device for piercing and opening a wall of a sealed metal container and for establishing gravity flow of liquid from the container into the underlying feed compartments.

Opening 18 in compartment 16 is bounded by a throat 80 from which projects upwardly a piercing device including one or more piercing and cutting elements 82 and a tubular shank portion 84 communicating with throat 80. Sealing means in the form of a resilient ring 86 is arranged around the shank portion 84 for sealing a wall of the container to prevent escape of liquid therefrom except through opening 18, and means such as a cam element 88 on shank portion 84 serves to hold the pierced wall of the container in sealing engagement with the ring 86. In addition, the piercing device is preferably surrounded by a drip plate 90 that underlies a substantial portion of the container wall and catches any liquid dripping from the container when removed from the dispenser after being emptied.

In the use of the structure just described, or of equivalent structures, a sealed supply container is placed on the dispenser in condition for delivery of its contents simply by pressing the container downwardly over the piercing device and then turning the container a few degrees around the axis of the piercing device. The wall of the container first strikes the piercing and cutting elements 82, which cut out a portion of the wall as the container is further moved downwardly. Thereafter the free edge of the container wall moves below cam element 88, and upon slight rotation of the container this free edge is forced into sealing relation with the resilient ring 86. The portion of the container wall cut out by these operations adheres to the container somewhat as illustrated in Figure 8. The foregoing operations open the container and permit drainage of liquid therefrom into feed compartment 16 through the shank portion 84 of the cutting device, throat 80 and opening 18; they also seal the container to the dispenser and prevent escape of its contents except through the dispenser.

In addition to the above, we preferably provide structure for facilitating complete drainage of liquid from the metal supply container. For example, the drip plate 90 is mounted around the piercing device and throat 80 so as to be movable downwardly against the compression of a spring 91 surrounding throat 80. The plate is formed with an upstanding marginal flange 92 which is located in spaced relation to the piercing device. Flange 92 is arranged in relation to element 88 and ring 86 so that it engages the bottom wall of a supply container that is being forced in place on the dispenser before such wall reaches element 88 or ring 86. Thereupon, the container and plate 90 are pressed downwardly together, against the compression of spring 91, until the pierced wall of the container passes below cam element 88, and the container is then turned to lock the margins of its opening beneath the lower portion of cam element 88 and to seal them against ring 86, as shown in Figure 9. When pressure is now removed from the container, spring 91 forces plate 90 and the container upwardly, and a substantial portion of the bottom wall of the container is automatically inclined downwardly toward the drainage opening therein, so that complete drainage of the container is greatly facilitated (see Figure 2). As shown in Figure 9, the shank portion 84 of the piercing device is formed with openings 94 adjacent the bottom wall of the container so that liquid draining to the pierced opening of the container is free to pass therethrough and into the underlying feed compartment.

When dispensing from sealed supply containers, the flow of liquid from the containers will ordinarily be retarded objectionably by the lack of adequate venting facilities, unless each container is punctured adjacent the top by a separate puncturing or venting operation. To avoid the necessity for such a puncturing operation and to keep the dispensing system, including a container holding liquid to be dispensed, enclosed at all times, we preferably provide venting means which enters the container with the piercing device and admits pressure into the container as required for flow of the liquid through the dispenser. In the illustrated embodiment, this venting means includes a tube 98 which opens through a side of the piercing device at its upper end and above the drainage point of liquid flowing from the container (see Figure 2). The tube 98 passes downwardly through throat 80 and opening 18 and communicates with the atmosphere at its other end through a spring pressed valve 99 which admits air under atmospheric pressure to the tube, when the pressure in the container is lower than atmospheric, but prevents the escape of fluid outwardly therefrom.

In the embodiment of Figures 1 to 3, inclusive, the branch conduits 22 and 22', communicating with feed compartments 16 and 16', respectively, are provided with spring-pressed ball valves 100 and 100' which are normally pressed by springs 102 and 102' against valve seats 104 and 104' so as to block the flow of liquid from the respective branch conduits toward the pump independently of the float-controlled valve means. A manually operated valve control, comprising a cam element 106 connected with a shaft 108 for actuation by a knob 110, is arranged between the ball valves 100 and 100', to permit movement of either valve to an open position allowing the flow of liquid therethrough. This is illustrated in detail in Figures 2, 3 and 5. The control knob 110 preferably has a pointer 112 fastened thereto to indicate the condition of the valves. When the cam 106 is moved in a counterclockwise direction, as illustrated in broken lines in Figure 5, valve 100 is opened and flow of oil from feed compartment 16 and container A is permitted so long as the float-controlled valve means is open, and when the cam is moved clockwise valve 100' is opened in the same manner.

In the use of the invention for dispensing lubricating oil at automobile service stations in accordance with a preferred embodiment, the oil is packed in sealed sheet metal cans, each holding enough oil for several dispensations, for example, five quarts, and the device is made ready for dispensing, assuming its feed lines full of oil, by placing sealed cans A and A' in dispensing position over feed compartments 16 and 16', respectively, in the manner described above. The attachment of the supply containers permits flow of oil into the respective feed compartments until the compartments are filled, during which floats 74 and 74' rise and valves 70 and 70' are opened. When it is desired to make a delivery of oil into a waiting vehicle, the dispenser is carried to a location adjacent the vehicle from which it is convenient to place the nozzle 32 of hose 28 in communication with the crank case or other part of the vehicle to be lubricated. The valve 36 of nozzle 32 is then opened by operation of handle 38, communication is established with one of the supply containers by appropriate turning of the control knob 110, and the pump handle 46 is then operated to feed and deliver lubricant from the selected supply container into the vehicle. As the operation of the pump reduces pressure conditions in the supply container, and feed compartment, the flow of liquid from the container takes place under pressure admitted through valve 99 and tube 98. Every increment of liquid delivered by the dispenser is registered by meter 50, and after the ordered amount, for example a quart, has been delivered, the valve of the nozzle 32 is closed by operation of handle 38, the nozzle is removed from the vehicle, and the device may then be carried to another location for another dispensing operation. When, after several such dispensations, the supply container first selected is emptied, and before the level of lubricant in the underlying feed compartment recedes to the communicating branch conduit, the float-controlled valve moves to a position blocking further flow from such feed compartment, and this condition is indicated to the operator of the dispenser by the resistance of the pump to further operation. Thereupon it is necessary only to turn the control knob 110 to a position opening the valve 100 or 100' for the other feed compartment and to continue pumping lubricant from such other feed compartment and the supply container communicating therewith, all without affecting the metering of the delivered oil. At any time after this occurs the emptied supply container may be removed from the dispenser, and another full container may be substituted in its place in the usual manner. The use of two feed compartments for receiving and feeding oil from two supply containers, as described above, has the advantage of avoiding interruption or delay in the delivery of an ordered amount of lubricant into a waiting vehicle when, for example, one of the two containers has previously been almost but not completely emptied. It also has the advantage that an emptied container may be permitted to remain on the dispenser until the last removable quantities of lubricant have drained from the container, thus enabling important savings of the lubricant without interfering with continued use of the dispenser.

The dispenser is preferably provided with a compartment 120 between the fixed feed conduit and hose 28, said compartment having transparent walls which permit full vision of the stream of liquid entering the hose for delivery. The vertical portion 26 of the fixed conduit also may conveniently carry a bracket 122 upon which the delivery end of the hose may be fastened when not in use, as illustrated in Figure 2.

A further embodiment of the invention, which may be preferred due to its smaller size and weight than the embodiment of Figures 1 to 3, inclusive, is illustrated in Figures 6 and 7. The dispenser, comprising a portable carriage 200 upon which dispensing means are mounted, is equipped with a single feed compartment 201 instead of two feed compartments. A fixed conduit 202 is connected with the lower portion of the feed compartment and extends therefrom toward the forward end of the carriage where it terminates in a vertical portion 204 and a delivery hose having a nozzle at its end, in substantially the same manner as shown in Figures 1 and 2. A pump 206 and a meter 208 are connected with conduit 202 substantially as in the first embodiment, and the feed compartment is provided with similar float-controlled valve means 210 and a check valve 212 for preventing backflow of liquid thereinto. Another check valve 214 may be provided between the pump 206 and meter 208 for blocking flow of liquid from the meter and parts beyond the meter toward the pump. This second embodiment, also, is preferably adapted for cooperation with sealed, frangible, supply containers, for example, as disclosed in connection with the first embodiment.

As further features of the illustrated embodiments of the invention, we preferably provide guides, such as pins 150, which are fastened to the carriage and arranged with respect to the piercing device above each feed compartment so that a sealed can may easily be centered over the piercing device by contacting it with such guides and then pressing it downwardly onto the piercing device (see Figure 7).

In addition, the dispensers include means facilitating the lifting and moving of the same to and from different locations for use. A novel and convenient assembly is provided by the illustrative construction in which a pump 40 is located at approximately the center of gravity of the dispenser and a handle 152 is secured to the top of the pump barrel 41 so that the operator of the dispenser may easily lift the entire dispenser, with or without supply containers thereon, and carry it to any desired location.

It will be apparent that the devices provided by this invention ensure accurate deliveries of oil, as ordered by the purchaser, without waste and without variation of amounts due to changing conditions. These devices are small and light enough to be carried and placed at any desired location, and they constitute complete, self-contained units that are independent of bulky supply tanks; hence their convenience and practicability for filling station operation. In addition, they provide effective protection against fraudulent substitution of brands or grades because the supply containers from which the oil is being dispensed are visible to customers, and cannot be refilled readily with an inferior brand of oil; after an attached supply container has been emptied, the dispenser remains inoperative until a container with a renewed supply of oil has been connected.

While the portable dispensers and dispensing practice herein disclosed are of particular value for use with sealed supply containers, or with keyed supply containers, it should be understood that the utility of the invention is not restricted to such practices but extends also to use with portable supply containers of any desired construction which may be placed in communicating relation to a feed compartment of the dispenser and easily removed therefrom after its content of liquid has been metered and dispensed by the operation of the device. It also will be apparent that the benefits of the present invention may be realized by the use of many different structural embodiments without limitation to details of construction and arrangements that are included in the illustrated embodiments. We therefore desire that the invention be accorded a scope fully commensurate with its contribution to the art as determined by a fair construction of the claims.

We claim:

1. In a liquid dispensing device, a feed compartment for receiving liquid from a portable supply container, a conduit communicating with the lower portion of said compartment, a pump connected with said conduit for feeding liquid from the compartment, valve means between the pump and the compartment for blocking flow of liquid toward the latter, and float-controlled valve means in said compartment for blocking flow of liquid toward said pump after a supply container is empty and before the level of liquid in the compartment recedes to the conduit, the aforesaid valve means including means operative to hold one valve slightly away from its seat when the other is closed whereby to prevent vacuum locking of the float-controlled valve upon actuation of the pump after the liquid from a particular supply container has been dispensed.

2. A portable liquid dispensing device comprising a portable carriage and dispensing means supported by said carriage including a compartment for receiving and passing liquid from an overhead, removable, portable supply container attached to the dispenser, a delivery conduit connected with said compartment for delivering liquid therefrom to a point of dispensation, and a pump connected with said conduit for feeding liquid through the same from an attached supply container, said compartment having an opening in its upper portion, opening means adjacent said opening for establishing communication and flow of liquid between a sealed supply container and said compartment when such sealed container is attached to the dispenser, said means comprising at least one cutting element for piercing and opening a wall of such sealed container, and means for deforming a portion of such opened wall to a position facilitating the drainage of liquid from the container.

3. In a liquid dispensing device comprising a compartment for receiving liquid through an opening in the compartment, means adjacent the opening for establishing communication and flow of liquid therethrough from an overhead, portable supply container, said means comprising at least one cutting element extending upwardly and operative to pierce and enter a wall of said portable supply container when the container is pushed downwardly thereon, a shank portion constructed to enter such container and to convey liquid flowing therefrom into said compartment, and a drip plate surrounding said shank portion to catch liquid dripping from an emptied container during removal thereof from the aforesaid means.

4. In a liquid dispensing device comprising a compartment for receiving liquid through an opening in the compartment, means adjacent the opening for establishing communication and flow of liquid therethrough from an overhead, portable supply container, said means comprising at least one cutting element extending upwardly and operative to piece and enter a wall of said portable supply container when the container is pushed downwardly thereon, a shank portion constructed to enter such container and to convey liquid flowing therefrom into said compartment, sealing means adjacent said shank portion for preventing the escape of liquid from the container, and means adjacent said shank portion for holding such wall in contact with said sealing means.

5. In a liquid dispensing device comprising a compartment for receiving liquid through an opening in the compartment, means adjacent the opening for establishing communication and flow of liquid therethrough from an overhead, portable supply container, said means comprising at least one cutting element extending upwardly and operative to pierce, enter and form an opening in a wall of said portable supply container when the container is pushed downwardly thereon and a shank portion constructed to enter the container through such opening and to convey liquid flowing therefrom into said compartment, means for holding the container on the aforesaid means, and means for inclining part of the pierced wall of the container downwardly toward said opening thereby facilitating drainage of the container.

6. A portable liquid dispensing device comprising a portable carriage and dispensing means permanently mounted on said carriage including two feed compartments, each for receiving and passing liquid from a portable supply container attached to the dispenser, means associated with each of said compartments for opening, attaching and sealing in dispensing relation thereto a normally separate, cooperating, portable supply container holding liquid to be dispensed, a main feed conduit in said carriage, a branch conduit connecting the main conduit and each of said compartments for carrying liquid into the main conduit from either compartment, a pump connected with said main conduit for pumping liquid therethrough, valve means in each branch conduit for blocking the flow of liquid into the main conduit, and valve control means operative when the valve means in one branch conduit is opened to close the valve means in the other branch conduit.

7. A portable liquid dispensing device comprising a portable carriage and dispensing means permanently mounted on said carriage including two feed compartments, each having an opening to admit liquid and means adjacent each opening for establishing communication and flow of liquid between the respective compartment and a removable portable supply container attached to the dispenser, a main delivery conduit, a branch conduit connecting the main conduit with the lower portion of each of said compartments for carrying liquid into the main conduit from either compartment, a pump connected with said main conduit for pumping liquid therethrough from said compartments, valve means for each compartment for automatically blocking flow of liquid into the respective branch conduit after a communicating supply container has been emptied and before the level of liquid in the compartment recedes to the conduit, valve means in each branch conduit for blocking the flow of liquid into the main conduit independently of said float-controlled means, and manually controlled means for opening and closing said last-recited valve means and operative when the corresponding valve means in one branch conduit is open to keep the valve means in the other branch conduit closed.

8. A portable liquid dispensing device comprising a portable carriage and dispensing means permanently mounted on said carriage including two feed compartments, each having an opening to admit liquid and means for establishing communication and flow of liquid through such opening between the respective compartment and a portable supply container attached to the dispenser, a main delivery conduit, branch conduits connecting the main conduit with said compartments, said main conduit terminating with a hose fastened at one end to said carriage and having a valve-controlled nozzle at its delivery end, a manually operable pump connected with said main conduit, a meter connected with said main conduit to gauge liquid fed therethrough by said pump, float-controlled valve means in each of said compartments for automatically blocking flow of liquid into the respective branch conduit after a communicating supply container has been emptied and before the level of liquid in the compartment recedes to the conduit, valve means in each branch conduit for blocking the flow of liquid into the main conduit independently of said float-controlled means, manually controlled means for opening and closing said valve means and operative when the valve means in one branch conduit is open to keep the valve means in the other branch conduit closed, and additional valve means for preventing the flow of liquid toward said compartment upon operation of said pump.

9. A portable liquid dispensing device that is sufficiently small and light to be lifted and carried by hand, with a supply of liquid thereon, to and from various locations for operation, comprising a portable carriage having means to support the same in upright position, dispensing means permanently carried by said carriage including at least one feed compartment having an opening in its upper portion to admit liquid from a removable, overhead, portable supply container, means for attaching and sealing such a supply container to the dispenser for delivery of its contents into said opening, a delivery hose fastened at one end to said carriage, a fixed conduit connecting said compartment with said hose, a meter connected with said conduit between the compartment and hose and having a dial visible from above said carriage, a manually operable pump connected with said conduit for discharging liquid from an attached supply container through said compartment, said conduit, said meter and said hose, a valve at the delivery end of said hose to prevent the discharge of liquid therefrom except upon actuation of said pump, and means operative to prevent the discharge of liquid when an attached supply container has been emptied.

10. A portable liquid dispensing device that is sufficiently small and light to be lifted and carried by hand, with a supply of liquid thereon, to and from various locations for operation comprising a portable carriage having means to support the same in upright position, dispensing means permanently carried by said carriage including at least one feed compartment having an opening in its upper portion to admit liquid from a removable, overhead, portable supply container, means for attaching and sealing such a supply container to the dispenser for delivery of its contents into said opening, a delivery hose fastened at one end to said carriage, a fixed conduit connecting the lower end of said compartment with said hose, a meter connected with said conduit between the compartment and hose and having a dial visible from above said carriage, an upright, manually reciprocable pump connected with said conduit for discharging liquid from said compartment through said conduit, meter and hose, a valve at the delivery end of said hose to prevent the discharge of liquid therefrom except upon actuation of said pump, and means operative to prevent the discharge of liquid when an attached supply container has been emptied, and a handle secured to the barrel of said pump to facilitate moving the device to various locations for the dispensation of liquid.

11. A portable lubricant dispenser comprising means for attaching thereto normally separate portable lubricant supply containers, means for effecting flow from an attached portable lubricant supply container into the dispenser, means for discharging lubricant from such attached container through the dispenser and directly into the crankcase of an automobile, means for indicating the quantity of lubricant discharged, a control chamber integral with the dispenser and independent of the attached supply container, and means within the control chamber to make the dispenser inoperative when an attached supply container has been emptied.

12. A portable lubricant dispenser comprising a portable carriage having mounted thereon means for attaching thereto normally separate portable lubricant supply containers, means for effecting flow from an attached portable lubricant supply container into the dispenser, means for discharging lubricant from such attached container through the dispenser and directly to a point of use, a flow indicator for indicating the quantity of lubricant discharged, valve means mounted on the dispenser independent of the attached supply container for preventing the discharge of lubricant from the dispenser, and means operative to actuate said valve means and render the dispenser inoperative when an attached supply container has been emptied.

13. A portable lubricant dispenser comprising a portable carriage having mounted thereon means for attaching thereto normally separate portable lubricant supply containers, means for effecting downward flow of lubricant from an attached portable lubricant supply container into the dispenser, means for discharging lubricant from such attached supply container through the dispenser and directly to a point of use, means for indicating the quantity of lubricant discharged, valve means mounted on the dispenser independent of the attached supply container for preventing the discharge of lubricant from the dispenser, and means operative to actuate said valve means and render the dispenser inoperative when an attached supply container has been emptied, said last-recited means being responsive to gravity flow of lubricant from an attached supply container into the dispenser to open said valve means and render the dispenser operative.

14. In a portable liquid dispenser, a portable carriage, means on said carriage for releasably supporting thereon normally separate portable liquid supply containers in dispensing relation thereto, means mounted on said carriage for discharging liquid from an attached supply container through the dispenser and directly to a point of dispensation, and means mounted on said carriage outside of such attached container and operative to prevent the discharge of liquid from the dispenser substantially immediately after an attached supply container has been emptied.

15. A portable dispenser for liquid lubricant or the like comprising a small chamber for receiving and passing liquid from comparatively large, normally separate portable liquid supply containers, means mounted on the dispenser for releasably attaching such a container thereto in fluid communication with said chamber, a delivery conduit for delivering liquid from the chamber, a pump connected with said conduit for feeding liquid from the chamber when a supply container containing liquid is attached to the dispenser, a meter connected with said conduit for gauging liquid fed by said pump, and means in said chamber responsive to the level of liquid therein for preventing operation of said pump when an attached supply container has been emptied.

16. A light-weight portable dispenser for dispensing liquid lubricant or the like comprising a carriage adapted to be lifted manually and to be carried to and from different locations for dispensing the lubricant, and dispensing means mounted on said carriage comprising interconnected feed lines fixed to the carriage, said feed lines including means at one end thereof for receiving liquid from a normally separate portable liquid supply container and a delivery hose and nozzle at another end thereof, a pump connected with said feed lines for discharging liquid from the dispenser, a meter connected with said feed lines for gauging liquid discharged by said pump, means on said carriage adjacent said receiving means for releasably attaching to and supporting on the dispenser such a normally separate portable liquid supply container, in a position above and in fluid communication with said receiving means, and means operative to prevent the discharge of liquid from said feed lines when the contents of an attached container supplying liquid to said receiving means have been exhausted by actuation of said pump.

17. In a liquid dispensing device comprising a chamber for receiving liquid from normally separate portable liquid supply containers, means adjacent said chamber for establishing communication and flow of liquid thereinto from such containers, said means comprising at least one cutting element extending upwardly and operative to pierce and enter a wall of a sealed frangible container pushed downwardly thereon and a shank portion constructed to enter the container through said wall to convey liquid therefrom into said compartment, and venting means adjacent said shank portion adapted to enter a container therewith and to admit pressure into the container.

18. A portable liquid dispenser for lubricant and the like comprising a small feed chamber, means adjacent said chamber for attaching to the dispenser normally separate portable supply containers, means for establishing fluid communication between an attached container and said chamber, a conduit connected with said chamber and terminating in a delivery hose and nozzle, a pump connected with said conduit for discharging liquid from the dispenser, a meter for indicating the quantity of liquid discharged, a valve in said nozzle to keep the hose full of oil, a valve in said conduit operative to block flow from the pump toward said chamber, and means within said chamber preventing the discharge of liquid therefrom through said conduit when an attached supply container has been emptied.

19. A portable liquid dispenser for lubricant and the like comprising means for attaching and sealing in dispensing relation thereto normally separate portable liquid supply containers, feed lines including a small receiving chamber, a delivery hose and intermediate conduits for conveying liquid from an attached container through the dispenser to a point of dispensation, means for forcing liquid directly from an attached container and through said feed lines, and means outside of such attached container and operative substantially immediately after an attached supply container has been emptied for preventing the discharge of air through the dispenser, and means operative constantly to maintain said conduits and delivery hose entirely full of liquid.

20. A portable liquid dispensing device comprising a portable carriage having mounted thereon a plurality of small separate feed compartments, means individual to each of said compartments for attaching normally separate portable liquid supply containers thereto and for sealing each container thereto when attached to effect flow therefrom into the respective compartment, means connected with all of said compartments for discharging liquid from containers attached thereto through the respective compartments and the dispenser and directly to a point of use, means individual to each compartment and outside of the container attached thereto operative to prevent the discharge of liquid therefrom when a supply container attached thereto has been emptied, and means preventing the discharge of liquid from more than one of said compartments at a time.

21. A portable liquid dispensing device comprising a portable carriage and dispensing means permanently mounted on said carriage including two small separate feed compartments, each for receiving and passing liquid from normally separate portable liquid supply containers, means individual to each compartment for attaching such a supply container thereto and for opening and sealing each container thereto when attached to effect flow therefrom into the respective compartment, a main delivery conduit, a branch conduit connecting said main conduit with each of said compartments, a pump connected with said main conduit for discharging liquid from such attached containers through the respective compartments and branch conduits and said main conduit, valve means individual to each branch conduit for blocking flow therefrom into the main conduit, and means individual to each compartment and outside of the container attached thereto operative to prevent the discharge of liquid therefrom when a supply container attached thereto has been emptied.

22. A portable lubricant dispensing device that is sufficiently small and light to be lifted and carried by hand, with a supply of lubricant thereon, to and from various locations for operation, comprising a portable carriage having mounted thereon a liquid inlet system including means for releasably attaching thereabove, opening and sealing dispensing relation thereto, one by one, normally separate, portable containers holding such lubricant supply, a liquid feed system extending from said inlet system through said carriage and terminating in a delivery tube secured to said carriage, means for maintaining the lubricant in such attacher supply container under atmospheric pressure, and pump means connected with said feed system for reducing pressure on lubricant between said pump means and such attached container, thereby causing lubricant to be forced from such container under atmospheric pressure, and for discharging a corresponding quantity of lubricant through said feed system under super-atmospheric pressure.

23. A portable lubricant dispensing device that is sufficiently small and light to be lifted and carried by hand, with a supply of lubricant thereon, to and from various locations for operation, comprising a portable carriage having mounted thereon a lubricant inlet system including an inlet throat and means adjacent thereto operative upon placement of a normally separate, cooperating, portable lubricant supply container on said system to open such container and attach and seal the same in dispensing relation to the dispenser, a lubricant feed system extending from said inlet system through said carriage and terminating in a flexible delivery tube secured to the carriage, pump means connected with said feed system for discharging lubricant directly from such attached supply container through said inlet throat and feed system and to a point of use, a meter connected to said feed system for indicating the quantity of lubricant discharged, and means associated with said feed system for preventing the pumping of air through said meter.

24. In a liquid dispensing device comprising a compartment for receiving liquid through an opening in the compartment, means adjacent the opening for establishing communication and flow of liquid therethrough from an overhead, portable supply container, said means comprising at least one cutting element extending upwardly and operative to pierce, enter and form an opening in a wall of such portable supply container when the container is pushed downwardly thereon and a shank portion constructed to enter the container through such opening and to convey liquid flowing therefrom into said compartment, a sealing ring of resilient material around said shank portion, a drip plate surrounding said shank portion and having an upstanding flange thereon for engaging said wall of the container, means yieldable under manual pressure to hold said flange normally at a level above said sealing ring, and means for holding margins of said pierced opening in contact with said sealing ring.

MARVIN S. YOUNG.
RAYMOND B. LEWTHWAITE.

CERTIFICATE OF CORRECTION.

Patent No. 2,258,636.   October 14, 1941.

MARVIN S. YOUNG, ET AL.

It is hereby certified that error appears in the printed specification of the above numbered patent requiring correction as follows: Page 1, second column, line 46, for "in accuracies" read --inaccuracies--; page 3, first column, line 19, for "and" read --the--; line 50, for "control" read --feed--; line 51, for "feed" read --control--; and second column, line 24, for "as" read --has--; page 6, second column, line 65, claim 4, for "piece" read --pierce--; page 7, first column, line 29, claim 6, for "and" read --with--; and second column, line 36, claim 9, for "into" read --through--; line 63, claim 10, for "into" read --through--; page 8, first column, line 28, claim 12, for "indicator" read --meter--; page 9, second column, line 5, claim 22, for "attacher" read --attached--; and that the said Letters Patent should be read with this correction therein that the same may conform to the record of the case in the Patent Office.

Signed and sealed this 6th day of January, A. D. 1942.

Henry Van Arsdale, (Seal)   Acting Commissioner of Patents.